United States Patent Office 3,220,977
Patented Nov. 30, 1965

---

3,220,977
LINEAR POLYESTERS FROM 4,4'-(CYCLOHEXYL-METHYLENE)DIPHENOLS
Winston J. Jackson, Jr., and John R. Caldwell, Kingsport, Tenn., assignors to Eastman Kodak Company, Rochester, N.Y., a corporation of New Jersey
No Drawing. Filed Sept. 14, 1961, Ser. No. 137,972
11 Claims. (Cl. 260—47)

This invention relates to preparation of new linear polyesters. More particularly, the invention relates to new linear polyesters from 4,4'-(cyclohexylmethylene) diphenols and dicarboxylic acids.

An object of the invention is to provide new linear polyesters from 4,4'-(cyclohexylmethylene) diphenols and dicarboxylic acids. A further object of the invention is to provide polymers which have high melting points and very high second-order transition and heat-distortion temperatures. A further object is to provide polymers having these properties which are soluble in volatile solvents, such as methylene chloride.

According to the invention, high-temperature resistant polymers are produced by condensation of dicarboxylic acids with 4,4'-(cyclohexylmethylene) diphenols having the general formula:

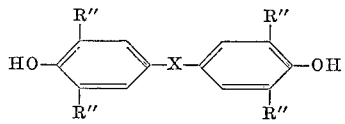

where $R''$ is hydrogen, a halogen atom, or alkyl $(C_1-C_4)$ and X is

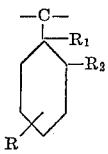

wherein R and $R_1$ are hydrogen atoms or alkyl groups containing from 1 to 4 carbon atoms and $R_2$ is hydrogen atom, phenyl group or alkyl group containing from 1 to 4 carbon atoms.

According to a more particular aspect of this invention there is provided a highly polymeric linear polyester having an inherent viscosity of at least 0.4 being a polyester of at least one bifunctional dicarboxylic acid and at least one bifunctional diol wherein at least 10 weight percent of the polymer consists of recurring units of a bisphenol residue having the general formula:

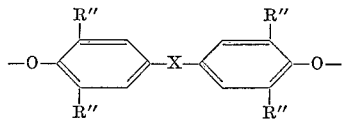

wherein $R''$ is a member selected from the group consisting of hydrogen atoms, chlorine atoms and alkyl radicals containing from 1 to 4 carbon atoms and X is a member selected from the group consisting of radicals having the general formula:

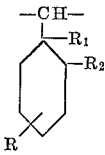

wherein R and $R_1$ are members selected from the group consisting of hydrogen atoms, chlorine atoms and alkyl radicals containing from 1 to 4 carbon atoms and $R_2$ is a member selected from the group consisting of hydrogen atoms, chlorine atoms and alkyl radicals containing from 1 to 4 carbon atoms and phenyl radicals.

The new polyesters exhibit unusually good properties at high temperatures. Polyesters previously prepared from bisphenols have generally lower melting points, heat-distortion temperatures, and second-order transition temperatures than the polyesters of the invention. It is found that as little as 10 weight percent of residues of these bisphenols in a polyester will substantially improve the high-temperature characteristics of the polymer. Because of the excellent high-temperature characteristics and the solubility of the bisphenol polymers in commercial organic solvents, the polyesters of the invention are particularly suitable for manufacture of film and fiber. A typical use for films made from polyesters of the invention is their use as film base for motion-picture film.

In preparing polyesters, it would be expected that decreasing the symmetry of a monomer and introducing big, bulky side groups would give a polymer with a lower melting point. However, it has been found that the melting point and second-order transition and heat-distortion temperatures of these polyesters are appreciably higher than in any other reported polyesters which also are soluble in low-boiling solvents. Since the polyesters of this invention are soluble in methylene chloride, they can be readily processed by casting films or spinning fibers. It is difficult to process polyesters of other types having similarly high melting points since they decompose on attempted extrusion and are insoluble in volatile solvents.

The polyesters are conveniently prepared by the ester-interchange of a diphenol and a phenyl or cresyl ester of a dicarboxylic acid. The reaction rate is increased by the use of a catalyst, such as the oxides, hydride or amide of an alkali or an alkaline earth metal. Other suitable catalysts include zinc oxide, lead oxide, dibutyl tin oxide, and sodium aluminate. The usual method of heating the reactants under vacuum to eliminate phenol or cresol is employed. The preferred method of building up the final molecular weight is by the solid-phase process in which the granulated polymer is heated in a vacuum at a temperature somewhat below the melting point. It is difficult to obtain polymers of high molecular weight by melt polymerization because of the very high melt viscosities of these polyesters. The polyesters may also be prepared with dicarboxylic acid chlorides. The diphenols can be treated with an equivalent amount of the acid chloride at 160–300° C. A more convenient method is the addition of the acid chloride to the diphenol in a two-phase system containing aqueous alkali and an organic solvent. The polymerization reaction may also be carried out in a tertiary amine such as pyridine or triethyl amine.

Another method of preparation involves the use of an acid ester of the diphenol, such as the diacetate or dipropionate. The diester is heated with a dicarboxylic acid to promote an acid interchange reaction with elimination of the aliphatic acid. The final stage of the polymerization is carried out under vacuum. A catalyst such as magnesium can be used to increase the reaction rate.

4,4'-(cyclohexylmethylene)diphenols are prepared as follows:

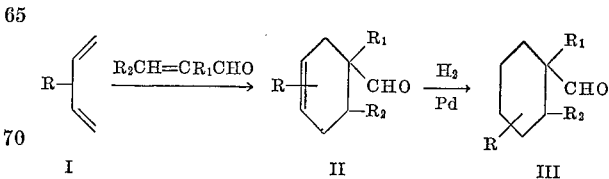

I           II           III

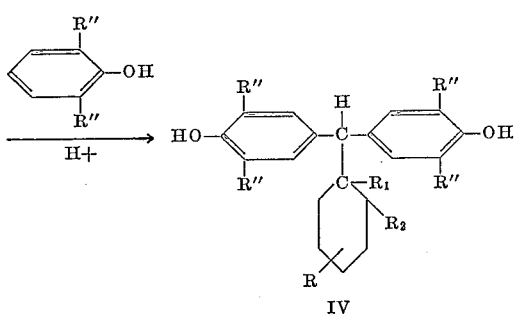

wherein R, $R_1$, $R_2$ and $R''$ are as defined above.

Alkyl groups (R) may be introduced in any of four positions of the cyclohexane rings by starting with the appropriately substituted butadiene (I). The first step is a conventional Diels-Alder reaction between butadiene (or a substituted butadiene) and an alpha, beta-unsaturated aldehyde. The double bond in the product is then reduced, and this saturated aldehyde is treated with a phenol in an acid medium to form the diphenol IV.

Some of the phenols which may be used to prepare the diphenols (IV) are phenol, o-cresol, 2,6-dimethylphenol, 2,6-dichlorophenol, etc.

A second method for conveniently preparing the saturated aldehyde (III) is to carry out an oxo reaction on cyclohexene or a substituted cyclohexene (V):

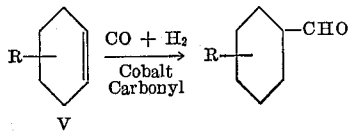

Polycarbonates are prepared by adding phosgene and/or a bischloroformate of a diol to a cooled, stirred aqueous mixture containing sodium hydroxide, the diphenol, a catalyst, and methylene chloride. On further stirring, the polymer builds up in the methylene chloride phase.

This invention can be further illustrated by the following examples of preferred embodiments thereof although it will be understood that these examples are included merely for purposes of illustration and are not intended to limit the scope of this invention unless otherwise specifically indicated.

Details for preparing bisphenols and polyesters are given in the following examples.

Example 1

Cyclohexanecarboxaldehyde was prepared by carrying out an oxo reaction on cyclohexene in a manner similar to that in U.S. Patent 2,437,600, in which this aldehyde was made. It may also be prepared by the Diels-Alder reaction between butadiene and acrolein (Ann., 460, 121 (1958)) followed by hydrogenation of the double bond in the adduct II (J. Chem. Soc., 738 (1949)).

4,4'-(cyclohexylmethylene)diphenol was prepared by stirring a mixture containing 124 g. (1.0 mole) of cyclohexanecarboxaldehyde, 376 g. (4.0 moles) of phenol, and 250 g. of concentrated hydrochloric acid. The reaction was exothermic, and the temperature rose to 75° C. Also, the mixture thickened. Stirring was continued 8 hours longer. The acid layer was decanted, and the remaining mixture was stirred for 1 hour with 250 ml. of benzene. It was filtered and thoroughly washed with benzene and water. The crude product, after drying, consisted of 207 g. of a pink powder, M.P. 216–219° C. Recrystallized from acetic acid, it melted at 223–224° C. The calculated analysis for $C_{19}H_{22}O_2$ was: C, 51.1; H, 7.8. Found: C, 51.02; H, 7.91.

Example 2

1-methyl-3-cyclohexene-1-carboxaldehyde was prepared from butadiene and methacrolein by the procedure in J. follows: 6-methyl-3-cyclohexene-1-carboxaldehyde was then reduced at room temperature with hydrogen at 500 p.s.i. in the presence of 5 percent palladium on alumina catalyst. The saturated aldehyde distilled at 93–97° C./100 mm. 4,4'-(1-methylcyclohexylmethylene)-diphenol was prepared from 1-methylcyclohexanecarboxaldehyde and phenol by the procedure of Example 1. It crystallized from aqueous acetic acid as colorless prisms, M.P. 183–184° C.

Example 3

2-methylcyclohexanecarboxaldehyde was prepared as follows: 6-methyl-3-cyclohexane-1-carboxaldehyde was prepared from butadiene and crotonaldehyde according to the procedure in Chem. Abstr., 32, 7906a (1938). Palladium catalyst (5 percent on alumina) was then added to the crude product, and the double bond was reduced at room temperature with hydrogen at 500 p.s.i. The saturated aldehyde distilled at 81–82° C./39 mm. 2-methylcyclohexanecarboxaldehyde was treated with phenol and hydrochloric acid by the procedure of Example 1 to produce 4,4'-(2-methylcyclohexylmethylene)diphenol. The product crystallized as a hydrate from aqueous acetic acid and melted at 207–209° C. after loss of the water.

Example 4

6-phenyl-3-cyclohexene-1-carboxaldehyde was prepared from butadiene and trans-cinnamaldehyde by the procedure used in Example 2. The crude product was then similarly reduced to the saturated aldehyde, 2-phenylcyclohexanecarboxaldehyde. The aldehyde was treated with phenol and hydrochloric acid by the method of Example 1 to produce 4,4'-(2-phenylcyclohexylmethylene)diphenol. The product was recrystallized from aqueous acetic acid.

Example 5

4,4' - (cyclohexylmethylene)bis(2,6 - dichlorophenol) was prepared as follows: 0.50 mole of 4,4'-(cyclohexylmethylene) diphenol and 600 ml. of acetic acid were heated to 40° C. While this mixture was stirred, 2.1 moles of chlorine was added, and the temperature was maintained at 40–50° C. The solution was stirred for 1 hour at 50° C. and then an equal volume of water was added to precipitate the product. It was converted to its disodium salt and recrystallized from a mixture of alcohol and acetone. The bisphenol was then regenerated with acetic acid. It gave a correct analysis for 4 chlorine atoms per molecule and melted at 150° C.

Example 6

Nitrogen was added to displace the air from a flask containing 8.47 g. (0.030 mole) of 4,4'-(cyclohexylmethylene)diphenol, 9.54 g. (0.030 mole) of diphenyl terephthalate, 0.005 g. of lithium hydride, and 0.001 g. of calcium hydride. While stirring, the mixture was melted down at 200° C. At 230° C. a vacuum of 30 mm. was applied, and phenol was distilled out while the temperature of the mixture was raised to 290° C. The pressure was reduced to 0.5 mm. and heating was continued for 15 min. while stirring. The polymer attained a high melt viscosity. After cooling under vacuum, the polymer was ground to pass a 20-mesh screen. Its molecular weight was further increased by raising the temperature from 180° to 250° C. under a vacuum of 0.1 mm. during 1 hour and then heating at 315° C. and 0.1 mm. for 1 hour longer.

The polymer had an inherent viscosity of 0.62 and a melting point above 350° C. A film cast from methylene chloride had a tensile strength of 9200 p.s.i., a heat distortion temperature of 275° C. and a second order transition temperature of 270° C.

Example 7

A polyester was prepared from 4,4'-(1-methylcyclohexylmethylene)diphenol and diphenyl terephthalate by the procedure of Example 6. The polymer had an inherent viscosity of 0.71 and a melting point above 350° C. The heat distortion temperature was 260° C.

Example 8

A polyester was prepared from 4,4'-(2-methylcyclohexylmethylene)diphenol and diphenyl trans-cyclohexane-1,4-dicarboxylate by the procedure of Example 6. The polymer had an inherent viscosity of 0.72 and a melting point above 300° C.

Example 9

A polyester was prepared from 4,4'-(cyclohexylmethylene)diphenol and diphenyl dimethylmalonate by the procedure of Example 6. The polymer had an inherent viscosity of 0.54 and a melting point above 300° C.

Example 10

A polyester was prepared from 4,4'-(2-phenylcyclohexylmethylene)diphenol and diphenyl isophthalate by the procedure of Example 6. The polymer had an inherent viscosity of 0.56 and a melting point above 300° C.

Example 11

Example 6 was repeated with diphenyl isophthalate instead of diphenyl terephthalate. The polymer had an inherent viscosity of 0.71, a melting point above 350° C. and a heat distortion temperature of 250° C.

Example 12

Example 6 was repeated with diphenyl trans-cyclohexane-1,4-dicarboxylate for the ester. The polymer had an inherent viscosity of 0.67, a melting point above 350° C. and a heat distortion temperature of 280° C.

Example 13

A polyester was prepared from 4,4'-(cyclohexylmethylene)bis-(2,6-dichlorophenol) and diphenyl isophthalate by the procedure of Example 6 but using dibutyl tin oxide as the catalyst. The polymer had an inherent viscosity of 0.59, a melting point above 350° C., and a heat distortion temperature above 300° C. The presence of the chlorine in the polymer substantially improved its resistance to burning.

Example 14

A copolyester was prepared from 4,4'-(cyclohexylmethylene)diphenol, 70 mole percent of diphenyl terephthalate and 30 mole percent of diphenyl sebacate by the method of Example 6 but omitting the solid-phase buildup. The polymer had an inherent viscosity of 0.61 and was valuable as a molding plastic.

Example 15

A copolyester was prepared from 4,4'-(cyclohexylmethylene)diphenol, 70 mole percent of diphenyl trans-1,4-cyclohexanedicarboxylate and 30 mole percent of diphenylazelate by the method of Example 6 but omitting the solid-phase build-up. The polymer had an inherent viscosity of 0.65 and was valuable as a molding plastic.

Although the invention has been described in considerable detail with reference to certain preferred embodiments thereof, variations and modifications can be effected within the spirit and scope of this invention as described hereinabove and as defined in the appended claims.

We claim:

1. A highly polymeric linear condensation polyester having an inherent viscosity of at least 0.4, being soluble in methylene chloride, said polyester consisting essentially of bifunctional constituents as follows:
   (A) From one to two dicarboxylic acids selected from the group consisting of the isomers of phthalic acid, the isomers of cyclohexane-1,4-dicarboxylic acid, and aliphatic acids solely composed of oxygen, hydrogen and carbon atoms, and
   (B) A diol consisting essentially of a bisphenol having the following general formula:

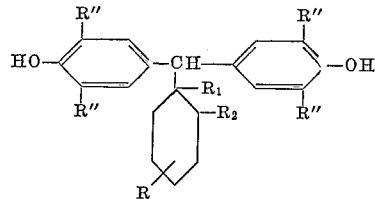

wherein each of R, $R_1$ and R'' represents a member selected from the group consisting of a hydrogen atom, a chlorine atom and an alkyl radical containing from 1 to 4 carbon atoms and $R_2$ represents a member selected from the group consisting of a hydrogen atom, a chlorine atom, an alkyl radical containing from 1 to 4 carbon atoms and a phenyl radical, said polyester having a melting point above 300° C. and a heat-distortion temperature above 250° C.

2. The polyester defined in claim 1 wherein the entire dicarboxylic acid constituent is terephthalic acid and the entire diol constituent is 4,4'-(cyclohexylmethylene)diphenol.

3. The polyester defined in claim 1 wherein the entire dicarboxylic acid constituent is terephthalic acid and the entire diol constituent consists of 4,4'-(1-methylcyclohexylmethylene)diphenol.

4. The polyester defined in claim 1 wherein the entire dicarboxylic acid constituent consists of trans-cyclohexane-1,4-dicarboxylic acid and the entire diol constituent consists of 4,4'-(2-methylcyclohexylmethylene)diphenol.

5. The polyester defined in claim 1 wherein the entire dicarboxylic acid constituent consists of dimethylmalonic acid and the entire diol constituent consists of 4,4'-(cyclohexylmethylene)diphenol.

6. The polyester defined in claim 1 wherein the entire dicarboxylic acid constituent consists of isophthalic acid and the entire diol constituent consists of 4,4'-(2-phenylcyclohexylmethylene)diphenol.

7. The polyester defined in claim 1 wherein the entire dicarboxylic acid constituent consists of isophthalic acid and the entire diol constituent consists of 4,4'-(cyclohexylmethylene)diphenol.

8. The polyester defined in claim 1 wherein the entire dicarboxylic acid constituent consists of trans-cyclohexane-1,4-dicarboxylic acid and the entire diol constituent consists of 4,4'-(cyclohexylmethylene)diphenol.

9. The polyester defined in claim 1 wherein the entire dicarboxylic acid constituent consists of isophthalic acid and the entire diol constituent consists of 4,4'-(cyclohexylmethylene)bis(2,6-dichlorophenol).

10. The polyester defined in claim 1 wherein 70 mole percent of the acid constituent consists of terephthalic acid and 30 mole percent consists of sebacic acid and the entire diol constituent consists of 4,4'-(cyclohexylmethylene)diphenol.

11. The polyester defined in claim 1 wherein 70 mole percent of the acid constituent consists of trans-cyclohexane-1,4-dicarboxylic acid and 30 mole percent consists of azelaic acid and the entire diol constituent consists of 4,4'-(cyclohexylmethylene)diphenol.

References Cited by the Examiner

UNITED STATES PATENTS

| | | | |
|---|---|---|---|
| 2,506,486 | 5/1950 | Bender et al. | 260—619 |
| 2,925,444 | 2/1960 | Levine et al. | 260—619 |

FOREIGN PATENTS 451,278  7/1936  Great Britain.

JOSEPH L. SCHOFER, Primary Examiner.

LOUISE P. QUAST, DONALD E. CZAJA, Examiners.